UNITED STATES PATENT OFFICE.

DAVID J. GUE AND JOSEPH C. GRANT, OF NEW YORK, N. Y., ASSIGNORS TO THEMSELVES AND JACOB SWIVEL, OF SAME PLACE.

PROCESS FOR PREPARING EXTRACT OF COFFEE.

SPECIFICATION forming part of Letters Patent No. 228,889, dated June 15, 1880.

Application filed September 17, 1879.

*To all whom it may concern:*

Be it known that we, DAVID J. GUE and JOSEPH C. GRANT, of the city, county, and State of New York, have invented a new and Improved Fluid Extract of Coffee and Process of Preparing Coffee, of which the following is a specification.

The object of our invention is to furnish a liquid or condensed extract of coffee uncooked, and containing all the aromatic and valuable qualities of the berry, and adapted for use simply by the addition of hot water with sugar and milk according to taste.

It is well known that coffee when ground rapidly loses the quality designated by the name "aroma," and when prepared for use by boiling or steeping parts with that quality still more rapidly, and soon becomes insipid, or a decoction containing only the bitter principles of the berry, without the finer qualities which are imparted to it by its fragrant volatile oils.

We make an extract containing the volatile and essential qualities of coffee, uncooked or unchanged by heat, and in a substantially fixed state, and also the bitter principle and other qualities, which can be extracted only by heat more or less. In this form the extract is adapted for sale for immediate use, or may be kept for the desired length of time by putting it up air-tight or adding certain ingredients.

The process of manufacture is as follows: We take ground coffee and make the fluid extract by repercolation with cold water—that is, the caffeine and volatile oils are extracted with cold water by repeated infusions, and a certain proportion of the percolate saved from each infusion, so that from ten pounds of ground coffee we have ten pounds of the fluid extract. We then take the grounds or refuse from this process and subject the same to a boiling or steeping process with hot water, using the quantity required for removing the bitter principle and other soluble constituents that could not be separated by the cold percolation, thereby producing an extract that requires only the addition of the flavoring portions to render it palatable. This last extract we then evaporate by any known process until it is reduced to about two and one-half pounds, or twenty-five per cent., of the first percolate, and when cold this evaporated extract is mixed with the percolate, so that we have from the ten pounds of coffee twelve and one-half pounds of fluid extract. These proportions we have found by experiment to be the best.

The mixture thus made, containing all the valuable and essential qualities of the berry, requires only the addition of hot water to make a strong highly-flavored drink. Such mixture will but slowly lose its volatile qualities if exposed to air, and, if desired, may be kept ready for use by closing it up air-tight, or by adding sugar or glycerine or any harmless antiseptic. We prefer, however, to make it for sale without such additions, as many persons cannot drink coffee sweetened.

In large cities it is to be manufactured and sold to restaurants, hotels, and families in quantities sufficient for supplying them, say, for a week at a time.

In making the bitter extract for mixing with the percolate, other elements may be added, and in some cases this is desirable—as, for instance, chicory may be used for economy, and other materials can be used in a greater or less proportion with the grounds from the first percolation.

Having thus described our invention, we claim as new and desire to secure by Letters Patent—

A process of producing a liquid extract of coffee that consists in first obtaining the extract of caffeine and volatile oils from ground coffee by repeated infusions of cold water, then boiling the grounds in hot water to obtain an extract containing the bitter principle, and finally mixing together the two extracts, substantially as described.

DAVID J. GUE.
JOSEPH C. GRANT.

Witnesses:
GEO. D. WALKER,
C. SEDGWICK.